March 10, 1936.  D. C. MORRIS ET AL  2,033,848
FRUIT AND VEGETABLE WASHING MACHINE
Filed July 17, 1934  2 Sheets-Sheet 1
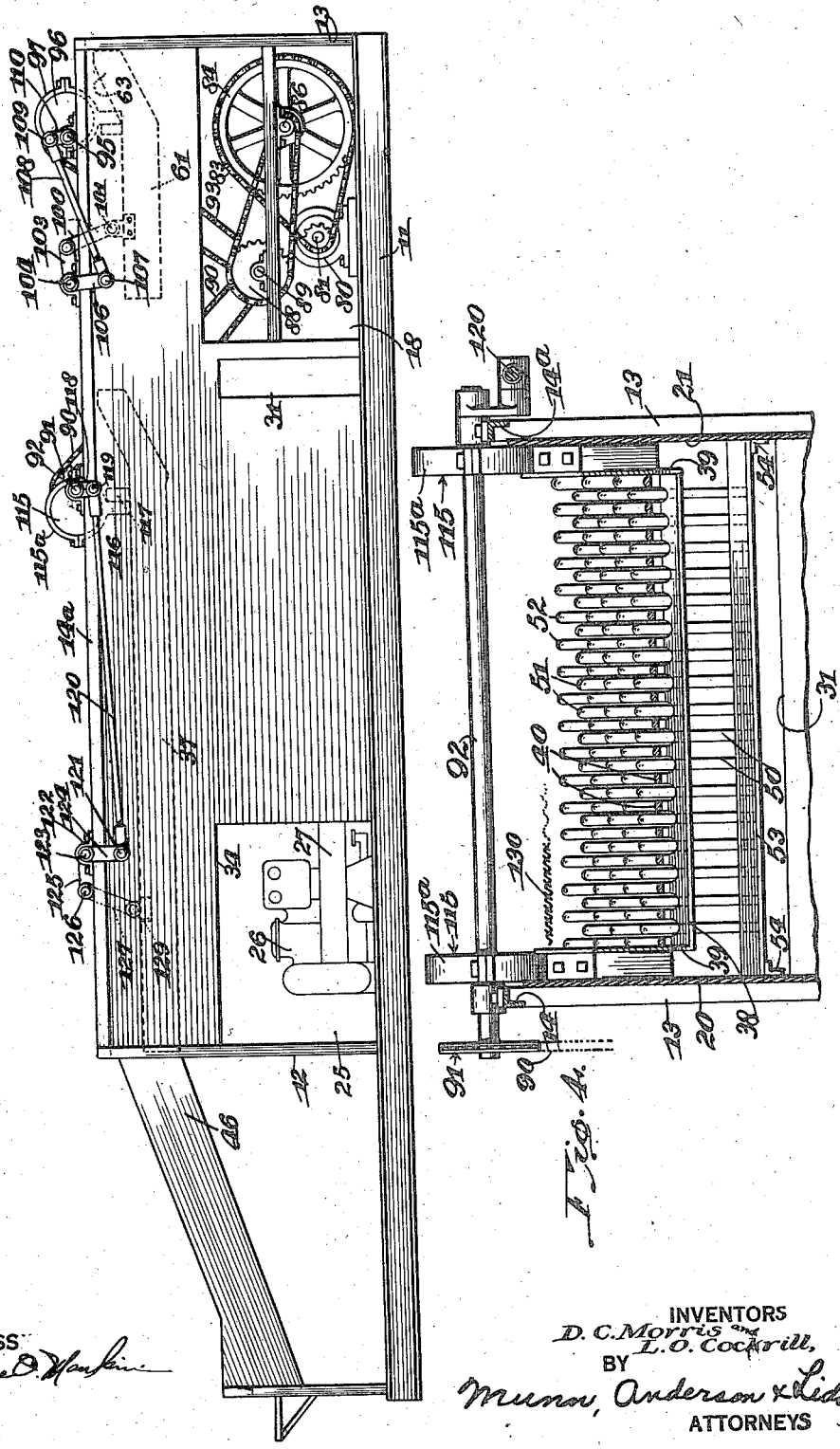
INVENTORS
D. C. Morris and
L. O. Cockrill,
BY
Munn, Anderson & Liddy
ATTORNEYS

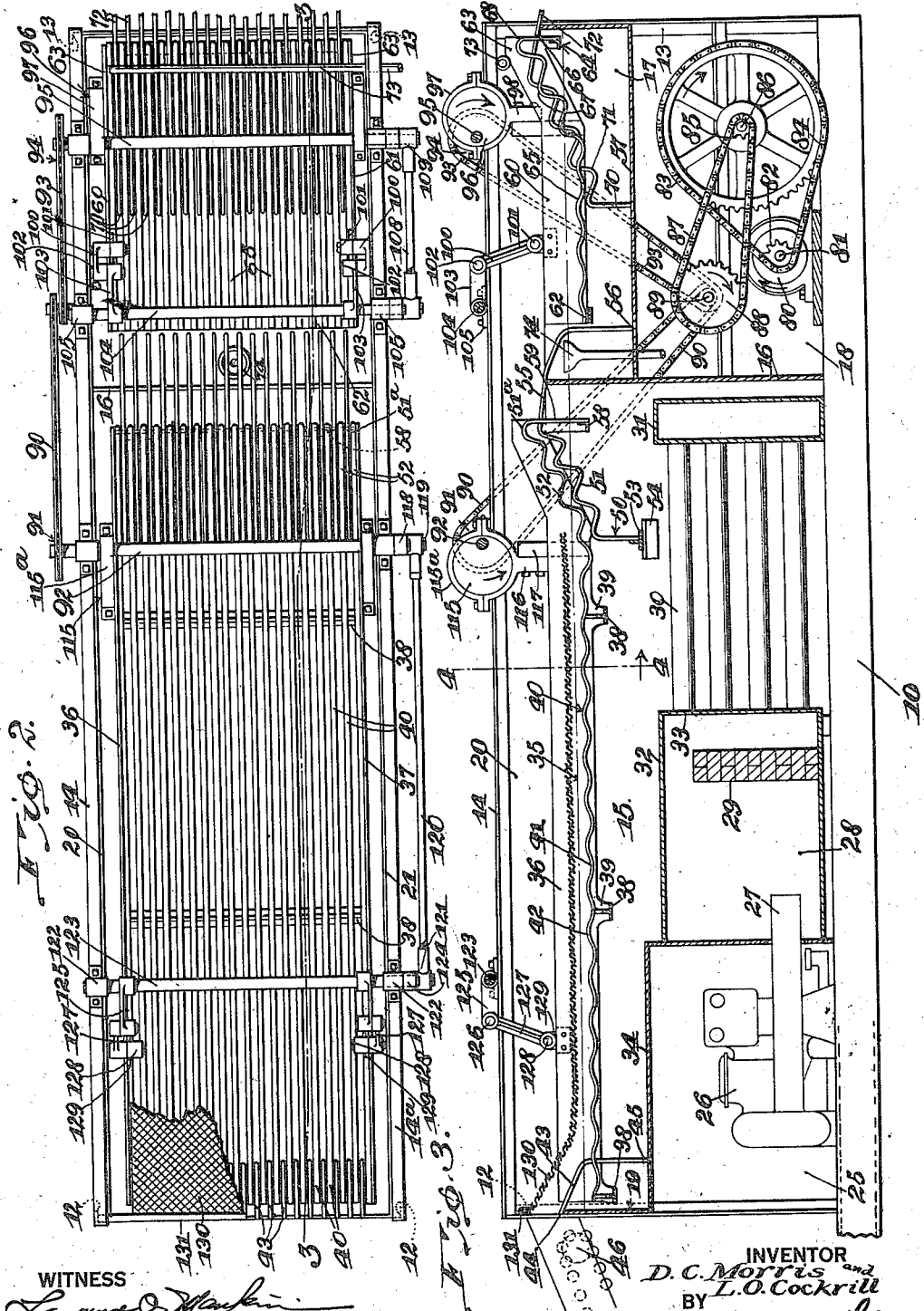

Patented Mar. 10, 1936

2,033,848

UNITED STATES PATENT OFFICE 2,033,848

FRUIT AND VEGETABLE WASHING MACHINE

Douglas C. Morris and Leonard O. Cockrill, Yakima, Wash., assignors to Fruit Packers Supply and Equipment Company, Yakima, Wash., a corporation of Washington Application July 17, 1934, Serial No. 735,642

1 Claim. (Cl. 146—194)

This invention relates to a fruit and vegetable washing apparatus.

An object of the invention is the provision of a fruit washing apparatus in which the buoyancy of the washing solution is utilized for aiding in supporting the fruit at the surface of the liquid while means are employed which are movable in a circular manner for raising the fruit above the liquid and revolving the same after which the fruit is lowered into the liquid again and then elevated up an inclined stepped portion for depositing the washed fruit upon an inclined table that discharges the fruit into a rinsing bath.

Another object of the invention is the provision of an apparatus for washing fruit or vegetables in which a plurality of members are moved through the upper portions of a liquid in a tank with the parts which engage the fruit being moved through a substantially circular motion for raising the fruit and lowering the same while causing rotation of the fruit, means being employed in connection with the raising and lowering elements adjacent one end of the tank for moving the washed fruits over the end of the tank and into a rinsing bath.

A further object of the invention is the provision of a plurality of metal strips arranged in spaced parallel relation having undulating surfaces with means for moving the strips simultaneously in such a manner that points of the strips which engage the fruits will take a circular course for elevating the fruit above the level of the liquid and into the liquid while causing rotation of the fruits with means located above the strips and resting substantially upon the fruits for causing a scrubbing action during the rotation of the fruits and during the progression of the fruits from one end of the tank to the other where at the last-mentioned points the fruits are elevated and discharged into a rinsing tank.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claim.

In the drawings:

Figure 1 is a side elevation of the fruit and vegetable washing device constructed in accordance with the principles of our invention, Figure 2 is a plan view of the washing apparatus, Figure 3 is a section taken along the line 3—3 of Figure 2, and Figure 4 is a transverse vertical section taken along the line 4—4 of Figure 3.

Referring more particularly to the drawings, 10 designates a base member which may include I-beams 11. From this base member rise angle irons 12 and 13. The angle irons 12 and 13 are connected together at their upper ends by means of longitudinally disposed angle bars 14 and 14a.

A tank 15 is supported upon the base member 10 and has one wall 16 common with a tank 17 and this wall is also common to the compartment 18 in which is housed certain mechanism for transmitting motion in a manner which will be presently explained. The tank 15 has an elevated end wall 19 and side walls 20 and 21.

A furnace room 25 for heating purposes is supplied with an oil burner, generally designated by the numeral 26. This oil burner has a pipe 27 for discharging hot gases into a heating chamber 28 against the firebrick wall 29. The hot gases pass beyond the wall 29 through horizontally disposed flue pipes 30 and thence into a flue 31 where the gases are then discharged to the atmosphere. It will be noted that the walls of the flue 31, pipes 30, the top wall 32 and side wall 33 of the heating chamber 28, together with the top wall 34 of the furnace room 25 are exposed to the washing liquids in the tank 15. The liquid in the tank is normally maintained at the level indicated by the line 35.

A frame which is adapted to have a predetermined movement, as will be presently explained, consists of a pair of spaced side bars 36 and 37 and these side bars are connected together by means of spaced angle irons 38. Depending from the lower edges of the side bars are lugs 39 to which the ends of the angle irons are connected.

Secured to the upper edges of the angle irons 38 which are T-shaped in cross section, are a plurality of strips of metal 40 having pockets 41 and alternately disposed elevations 42 thus forming an undulating surface on the strips. These strips extend longitudinally of the tank 15.

At the receiving end of the tank is provided a slotted table 43 and this table has its upper end, as shown at 44, connected to the upper edge of the end wall 19. The lower end of the table, as shown at 45, is connected to the top 34 of the furnace room 25. The table 43 may be formed of strips of metal instead of being slotted, but in any event the slots are of such a width that the strips 40 may be received within the slots for reciprocation.

A conveyor, generally designated by the numeral 46, has its upper end adjacent the table 43 so that as the fruit or vegetables are fed upon the conveyor they are carried upwardly and dumped upon the inclined table 43 whence they will roll downwardly into the solution and float upon the solution or at times be supported by the bars or strips 40.

A plurality of strips 50 having stepped portions 51 are disposed in spaced relation adjacent the inner ends of the tank 15 and are adapted to be received in the spaces between the strips or bars 40. These strips, however, are maintained stationary while the elevated and stepped portion 52 of the strips 40 are moved through the stepped portions 51 of the strips 50.

These strips are supported by an angle iron 53 secured to the side walls of the tank and this angle iron is supported by a bracket 54 secured to the side walls of the tank.

The strips 50 merge into an inclined table portion 55 which is adapted to receive the fruit or vegetables that have been elevated by the stepped portion 52 of the strips 40 and this table is continued downwardly, as shown at 56, and secured to a bottom portion 57 of the tank 17.

An angle iron 58 connects the depending portions 59 of the strips or bars 40 at the inner terminals of said strips or bars.

Referring more particularly to Fig. 3 in which the tank 17 is shown, it will be seen that a second reciprocatory member is employed and consists of a pair of side bars 60 and 61 which are spaced from the side walls 20 and 21. The inner lower ends of these bars are connected together by means of a transverse bar 62 while the outer elevated portions 63 are connected together by means of an angle iron 64. A plurality of metal strips 65 are located in spaced relation and are connected to the bars 62 at their inner ends. The outer ends of the strips are bent downwardly, as shown at 66, and are connected to the angle irons 64.

These strips likewise are corrugated to provide an undulating surface for engaging the fruit and they also have stepped portions 67 and a raised portion 68 at their outer ends.

A plurality of stationary strips 70 are connected at their inner lower ends to the bottom 57 of the tank 17. These strips have stepped portions 71 disposed between the spaced strips 65. These strips are extended upwardly and are provided with an inclined table portion 72 which discharges the fruit into a third tank (not shown) containing a washing solution.

The tank 17 is provided with a spraying device, indicated at 73, for spraying the fruit with fresh water as it is being elevated to the inclined table 72.

An overflow pipe 74 is located in the tank 17 and passes through the bottom 57 for maintaining the liquid in the tank at a predetermined level.

A driving means for the members 40 and 65 are disposed partly in the chamber 18 in which is placed an electric motor 80. This motor drives a shaft 81 and a sprocket 82. The sprocket in turn drives a chain 83 and therefore a sprocket 84.

A sprocket 85 is driven by a shaft 86 which is secured to the sprocket 84. The sprocket 85 drives a chain 87 driving in turn a sprocket 88 secured to a shaft 89. The shaft 89 causes to be driven a chain 90 which in turn drives a sprocket 91 and likewise a shaft 92 which is secured to said sprocket.

A chain 93 is caused to be driven by the shaft 89 and this chain drives a sprocket 94 which is secured to a shaft 95 so that the shaft is likewise driven. Arrows on the various elements show the direction of rotation of said elements.

An eccentric 96 is secured to the shaft 95 and is revolved thereby. Mounted upon the eccentric is a strap 97 having a depending arm 98 which is secured to the bar 60. It will be noted that a pair of the eccentrics are located upon opposite sides of the tank and a duplicate construction is provided so that the depending arms 98 of the straps are secured to respective side bars 60.

A link 100 is pivotally connected at 101 at each side of the tank and the pivotal connection is secured to its respective side bar 60. The upper end of the link 100 is pivotally connected at 102 to a lever 103 which has its opposite ends secured to a shaft 104 mounted in a bearing 105 on the angle iron 14.

A lever 106 is secured to the shaft 104 and is pivotally connected at 107 with one end of a rod 108. The other end of the rod is pivotally connected at 109 with a lever 110 which is secured to the shaft 95.

An eccentric 115 is rigidly secured to the shaft 92 and has a depending arm 116 secured to a post 117 which in turn is connected to a side bar 36. It will be noted that a duplicate construction is located upon each side of the tank and outwardly of the side bars 36 and 37. A lever 118 is secured to the shaft 92 and the free outer end of this lever is pivotally connected at 119 with one end of a rod 120. The opposite end of this rod is pivotally connected at 121 with a lever 122 which is secured to a shaft 123. This shaft is mounted in a bearing 124 carried by a top rail 20 or 21 as the case may be. A lever 125 is secured to the shaft 123 and is pivotally connected at 126 with a link 127 and this link is pivotally connected at 128 with a bearing 129 that is secured to the side bar 36 or 37 as the case may be. It will be noted that a similar construction is mounted on the angle iron 37 at the other side of the tank.

When fruits have been sprayed to prevent loss, this fruit must be washed in order to remove any of the poisons. For this purpose we propose to wash the fruit with an alkali bath, then remove the fruit, rinse the same, and then run the fruit through a weak acid solution of any well known type for the purpose, after which the fruits are again rinsed. The tanks and equipment for carrying out the washing by acid and the rinsing process are not disclosed since these tanks are substantially identical in construction with the equipment described above in connection with the alkali wash and the rinsing apparatus. In other words, any duplications of the constructions shown in Figs. 2 and 3 may be employed in series without departing from the scope of the invention.

The operation of my device is as follows: The fruit, or in some cases vegetables, are carried by the conveyor 46 to the tank 15 and they are deposited upon the inclined table 43 and below the sheet of material 130. This material is connected at 131 to the end wall of the tank 15 and sufficiently above the outer end of the table 43 to permit the fruit to roll down over the table and beneath the sheet of material 130. This material may be formed of any suitable type of fabric which has a sufficiently coarse surface to furnish a scrubbing action of the fruit as it is passed through the tank 15. This sheet of material, as will be seen from Fig. 3, extends substantially the full length of the horizontal portions of the corrugated members 40. The material may be made of fabric, rubber, or it may have a brush effect at the inner surface where it will engage the fruit and act as a scrubber for the same as the fruit is being moved longitudinally of the tank 15. A plurality of floating brushes may be used instead of the sheet of fabric.

The eccentrics 115 and 96 are driven in the directions indicated by the arrows in Fig. 3 and the straps 115a and 97 operate the arms 116 and 98, respectively, for causing the inner ends of the side bars supporting the strips 40 and 65, respectively, through a rotary motion.

The rods 120 which are operated by the levers 118 actuate the levers 122, the levers 125, and likewise the links 127 so that the side bars connected to the links 127 and the arms 116 will be moved through a motion which may be termed a parallelogram.

The frame which includes the side bars 36 and 37 is moved upwardly and downwardly and shifted forwardly so that the corrugations 42 of the strips 40 move the fruit longitudinally of the tank until they reach the stepped portion 51 of the strips 50. At this portion the stepped portion 52 of the strips 40 move through the stepped portions 51 and progressively elevate the fruit along the steps 51 until they reach the inclined table 55. The elevated portion 51a of the stepped portion holds the fruit at this time on the table so that when this portion is lowered below the table the fruit will roll down the inclined table and into the rinsing tank 17.

It will be borne in mind that the fruit is floated on the liquid and that the corrugated portions 42 merely move the fruit forwardly. The fruit is not only moved forwardly but is revolved and the surfaces come constantly in contact with the fabric 130 to give a scrubbing action. The same kind of operation of moving the fruit through the rinsing tank and outwardly thereof is had as has been just explained in connection with the tank 15.

The eccentrics 96 and the links 100 cause the spaced strips 65 to be moved through a motion in the shape of a parallelogram so that the corrugations of the strips 65 move the fruit longitudinally through the rinsing bath after which the fruits are raised step by step upon the stationary strips 70 until they reach the inclined platform 72 whence they are released by the elevated portions 68 of the strips 70 as said elevated portions are lowered below the table 72 to permit the fruit to roll into the acid bath (not shown).

We claim:

A fruit washing apparatus comprising a tank adapted to be filled to a predetermined level with a washing solution for fruits, a plurality of spaced movable strips having horizontal sections provided with alternately disposed convex and concave portions, said strips being connected together and normally located sufficiently below the level of the liquid in the tank to permit the fruit to float on the liquid, the outer ends of the strips being inclined upwardly to a point above the adjacent end of said tank and having corrugations the walls of which being substantially at right angles to each other to provide stepped portions, a plurality of stationary strips disposed alternately with the inclined ends of the movable strips and having stepped portions, the movable stepped portions cooperating with the stationary stepped portions for elevating the fruit from horizontal sections of the movable strips, and means for moving the movable strips simultaneously so that points on the strips will be urged through a path appproximating a circle.

DOUGLAS C. MORRIS.
LEONARD O. COCKRILL.